United States Patent Office 3,529,904
Patented Sept. 22, 1970

3,529,904
DIAPHRAGM SEAL STRUCTURE
Augustine J. Scalzo, Philadelphia, and James H. Borden, Springfield, Pa., assignors to Westinghouse Electric Corporation, Pittsburgh, Pa., a corporation of Pennsylvania
Filed Oct. 28, 1968, Ser. No. 770,927
Int. Cl. F01d 9/00, 1/00; F02f 11/00
U.S. Cl. 415—136                7 Claims

ABSTRACT OF THE DISCLOSURE

A seal support arrangement for a bladed diaphragm of an axial flow elastic fluid machine, such as a gas turbine, that reduces leakage past the diaphragm blades is provided. A seal housing ring is supported from diaphragm segments by radially movable keys, thus permitting relative radial motion between the diaphragm segments and the seal assembly, while maintaining the seal concentric with the shaft. Centering of the seal housing ring is accomplished by utilizing integral guide keys and pins together with adjustable eccentric bushings.

BACKGROUND OF THE INVENTION

This invention relates, generally, to elastic fluid machines, such as turbines, and, more particularly, to seal structures for bladed diaphragms of the machines. The diaphragms are provided with inner shroud segments which encompass bladed rotors of the machines, and seal members are provided which reduce leakage of the elastic fluid past the diaphragm blades. In some prior structures the seal members are welded directly to the diaphragm, thus necessitating radial clearances large enough to accommodate the large transient thermal growths inherent in the machines, particularly gas turbines. The large radial clearance reduces the effectiveness of the seal and permits leakage which lowers the efficiency of the turbine.

A diaphragm seal support structure is described in a copending application, Ser. No. 641,565, filed May 26, 1967, now Pat. 3,408,048 by A. J. Scalzo and assigned to the same assignee as this invention. In the foregoing structure, seal segments are disposed in a seal housing structure carried by the inner shroud of the diaphragm and slidably keyed thereto for relative radial movement to permit thermal expansion to occur without stress in the components and without adversely affecting concentricity of the seal segments. The seal support structure disclosed in the aforesaid application provides an efficient seal as it does not require large radial clearances. However, because of the close tolerances required and manufacturing inaccuracies, each one of the radial key blocks must be individually fitted in a keyway or guide slot in order to center the seal housing in the turbine casing.

An object of this invention is to provide an improvement in the seal support structure disclosed in the aforesaid application.

Another object of the invention is to simplify the manufacturing and facilitate the assembling of the components of a turbine diaphragm seal support arrangement.

Other objects of the invention will be explained fully hereinafter or will be apparent to those skilled in the art.

SUMMARY OF THE INVENTION

In accordance with one embodiment of the invention, a bladed diaphragm structure, forming a part of a stage in an axial flow gas turbine or the like, is divided into arcuate segments and mounted in a blade ring in the turbine casing. A seal housing ring is supported from the diaphragm segments by radially movable key blocks, thus permitting relative radial motion between diaphragm segments and the seal assembly, while maintaining the seal concentric with the shaft. During assembly of the seal structure, centering of the seal housing ring is accomplished by utilizing integral guide key blocks and cylindrical pins mounted in adjustable eccentric bushings retained in the seal housing, thereby permitting the components of the seal structure to be assembled without requiring hand fitting of any of the components.

BRIEF DESCRIPTION OF THE DRAWINGS

For a better understanding of the nature and objects of the invention, reference may be had to the following detailed description, taken in conjunction with the accompanying drawings, in which.

DESCRIPTION OF THE PREFERRED EMBODIMENT

Figure 1:
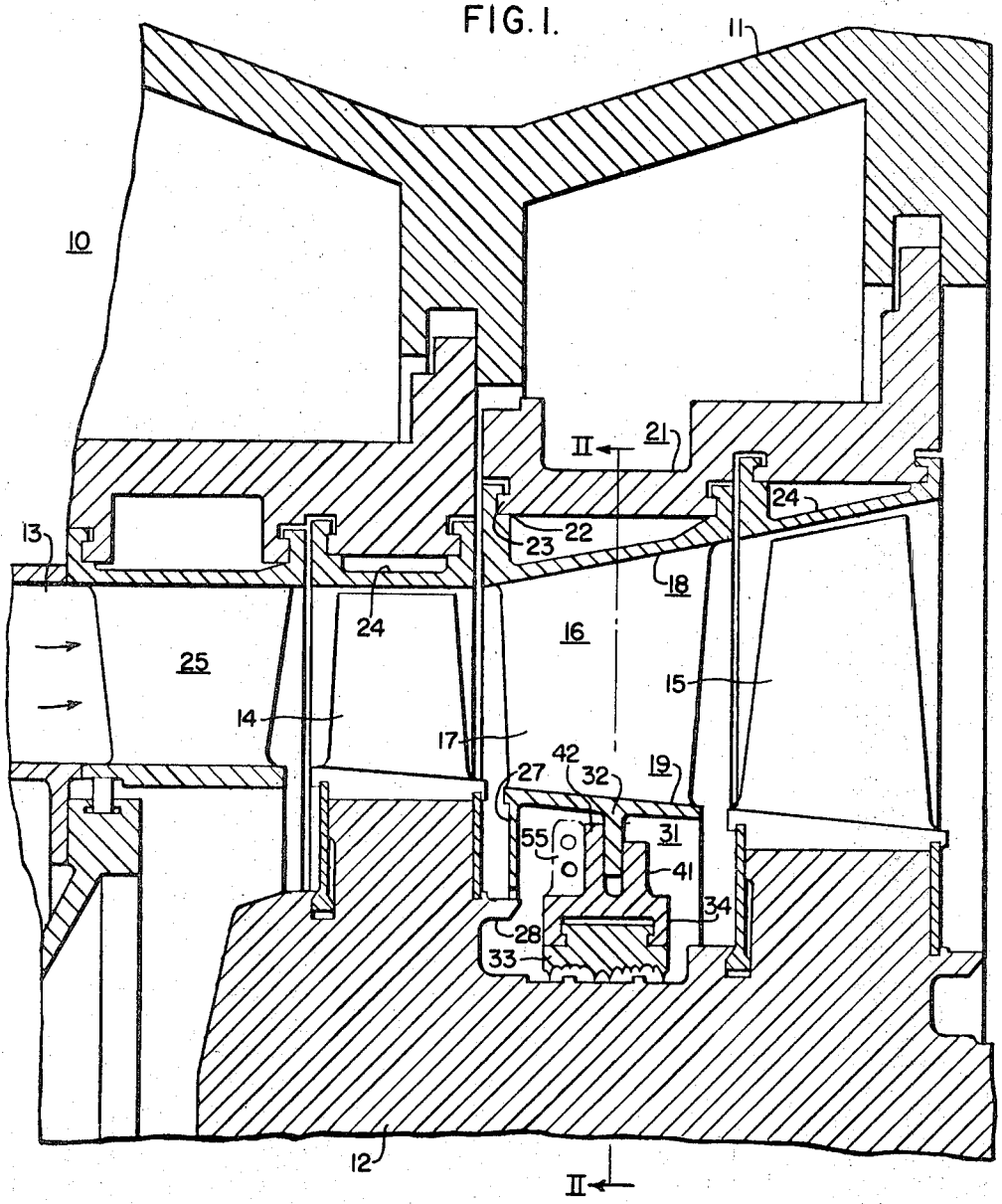
FIG. 1 is an axial sectional view of a portion of a gas turbine embodying principal features of the invention.
Figure 2:
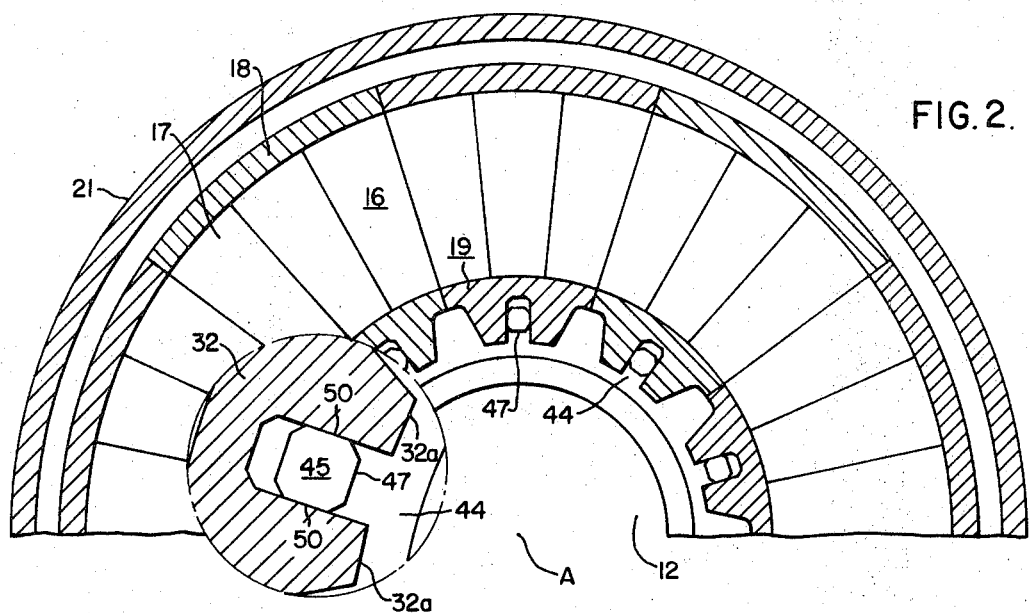
FIG. 2 is a transverse sectional view, taken generally along the line II—II in FIG. 1.

Referring to the drawings, particularly to FIGS. 1 and 2, the portion of a turbine 10 shown therein comprises a casing 11, generally circular in cross section, and a rotor 12 rotatably mounted in the casing and supported in suitable bearings (not shown) for rotation about its central axis A. The casing 11 and the rotor 12 jointly define an annular passage 13 through which hot motive fluid flows in an axial direction as indicated by the arrows in FIG. 1. The motive fluid may be the product of fuel combustion from combustion chambers (not shown), such as those utilized in a gas turbine.

The rotor 12 is provided with at least two axially spaced rows 14 and 15 of rotor blades carried by the rotor and extending radially outwardly across the passage 13. Additional rows of rotor blades may be provided if desired, thereby increasing the number of motive fluid expansion stages in the turbine. An annular diaphragm structure 16 is disposed within the casing 11 in encompassing concentric relation with the rotor 12. The diaphragm 16 has an annular array of stationary blades 17 extending across the passage 13 between the two rows of rotor blades 14 and 15. The stationary blades of the diaphragm direct the flow of motive fluid into the rotor blades to motivate the rotor in a manner well known in the art.

As shown more clearly in FIG. 2, the diaphragm structure 16 is divided into a plurality of segments disposed in closely spaced relation with each other in annular array. In the present instance, each half of the diaphragm structure is divided into five equal segments, hence each segment extends 36°. Each segment has an outer arcuate shroud segment 18 and an inner arcuate shroud segment 19 between which the blades 17 are secured.

As shown more clearly in FIG. 1, the diaphragm structure 16 is supported by a blade ring 21 mounted inside the casing 11 in any suitable manner. The outer shroud segments 18 are generally channel-shaped in cross section with grooves 22 provided in opposite sides of the channel for receiving tongues or projections 23 on the blade ring 21, thereby slidably retaining the outer shroud segments to the blade ring.

As also shown in FIG. 1, ring segments 24, which are similar in cross section to the shroud segments 18, are attached to the blade ring 21 in a manner similar to the manner in which the shroud segments 18 are attached. The ring segments 24 encircle the rotor blades 15. An additional diaphragm structure 25, generally similar to the diaphragm structure 16, is also provided. As well known in the art, the diaphragm 25 and rotor blades 14 form a first expansion stage, while the diaphragm 16 and the rotor blades 15 form a second expansion stage.

As shown in FIG. 1, the inner shroud ring 19 is provided with an annular radially inwardly extending flange 27 which cooperates with an annular shoulder 28 on the rotor 12 to provide an initial restriction to leakage of motive fluid past the diaphragm structure 16. However, the primary restriction to leakage of the motive fluid is provided by a diaphragm seal assembly 31 supported by an arcuately segmented radially inwardly extending rib 32 on the inner shroud 19. The seal assembly 31 cooperates with the rotor 12 to prevent leakage along the rotor.

Figure 3:
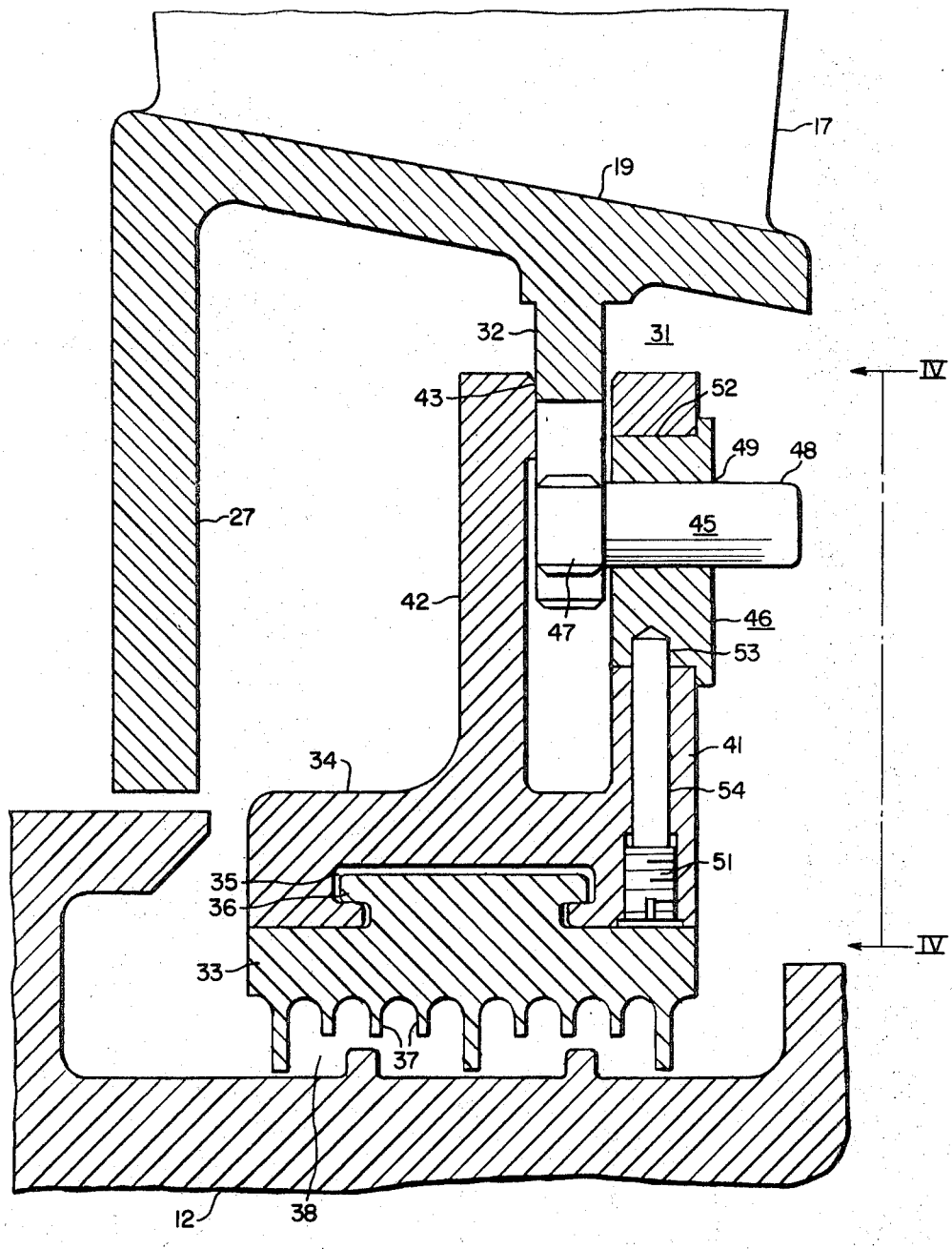
FIG. 3 is an enlarged detail view, in section, of one support for the seal housing ring.

As shown more clearly in FIG. 3, the diaphragm seal assembly 31 comprises an annular array of seal members or shoes 33 formed as arcuate segments and carried by an annular seal housing ring 34 in closely spaced sealing relation with the rotor 12. The seal housing ring 34 is provided with an annular keyway 35 and the seal segments 33 are provided with annular keying portions 36 slidably retained in the keyway 35. The seal surface of each seal segment 33 may be provided with annular ribs 37 of tooth shape in cross-section forming a labyrinthian restricted passage 38 with the seal surface of the rotor 12, thereby restricting the flow of fluid along the rotor.

Figure 4:
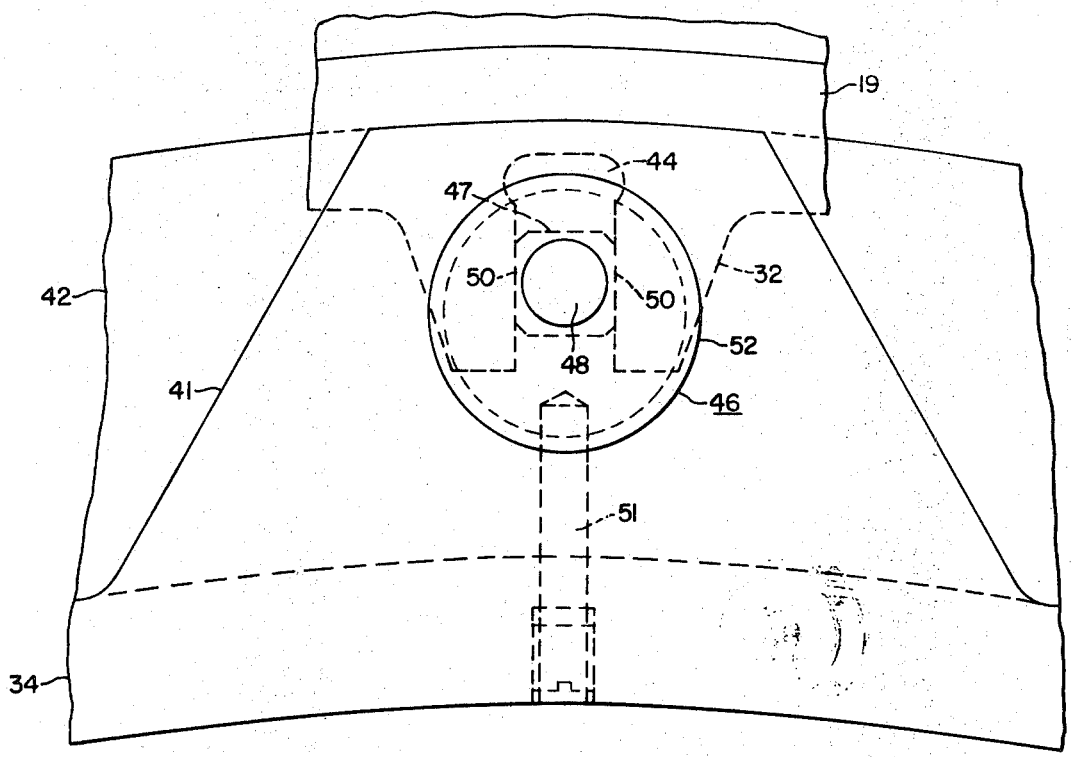
FIG. 4 is an enlarged detail view, in elevation of the seal housing ring support, taken in the area indicated by line IV—IV in FIG. 3, and looking in the direction shown by the arrows.

As also shown in FIG. 3, the seal housing ring 34 has a radially outwardly extending rib 41 overlapping a portion of the rib 32 on the inner shroud 19. The seal ring 34 has an additional annular rib 42 axially spaced from the rib 41 and having a surface 43 engaging the side of the rib 32 opposite the side of the rib adjacent to the rib 41. As shown in FIG. 4, the rib 42 is annularly continuous, but the rib 41 may be formed as a series of circumferentially spaced projections of a generally trapezoidal shape. This arrangement is similar to that described in the aforesaid copending application Ser. No. 641,565.

As shown more clearly in FIG. 2, radial slots 44 in circumferentially spaced projections 32a on the rib 32 guide the movement of integral guide keys and pins 45 which are supported by eccentric bushings 46 retained in the rib 41 of the seal housing 34 as shown in FIGS. 3 and 4. Each integral guide key and pin 45 has a head portion 47, which is generally square with oppositely disposed flat surfaces 50 slidably disposed and closely fitted in the slot 44, and a cylindrical portion 48 mounted in an eccentrically disposed opening 49 in the bushing 46. A threaded locking pin 51 is utilized to lock each eccentric bushing 46 in position in a cylindrical opening 52 in the rib 41. During operation of the turbine, the stage pressure drop forces the seal housing ring rib 42 against the diaphragm rib 32, thereby preventing leakage across the seal assembly 31. The seal segments 33 cooperate with the rotor 12 to reduce leakage along the rotor.

As explained in the aforesaid copending application, the seal housing ring 34 may be divided into two halves joined together at a horizontal joint 55 (see FIG. 1). The two halves may be joined together by bolts prior to the assembling of the blade ring 21 and casing 11. When the casing 11 and blade ring 21 have horizontal joints, the radial guide keys 45 may be provided in the lower half only of the seal housing ring, thus providing for easy access to rotor 12.

The assembly of the seal structure is accomplished without requiring any hand fitting of mating surfaces. The procedure is as follows: First, the seal housing ring 34 is positioned concentrically with the axis of the turbine. The heads 47 of the integral guide keys and pins 45 are inserted into the radial guide slots 44 in the diaphragm projections 32a. The eccentrically disposed openings 49 in the bushings 46 are aligned with the cylindrical ends 48 of the integral guide keys and pins 45 and the bushings are inserted into the cylindrical openings 52 in the rib 41 of the seal housing 34. Lock pin holes 53 are drilled into the eccentric bushings 46, using previously drilled radial holes 54 in the seal housing 34 as guides. The lock pins 51 are then inserted and staked to prevent loosening. The seal segments 33 may then be installed in the seal housing 34.

During transient temperature cycles, the diaphragm segments in the turbine casing and the seal housing ring expand radially inwardly or outwardly at different rates. To accommodate this relative displacement, the heads 47 of the integral guide keys and pins 45 slide in the radial slots 44. The only resistance to this motion is the frictional resistance resulting from the weight of the diaphragm seal assembly. The cylindrical ends 48 of the guide keys 45 rotate slightly in the eccentric bushings 46 to accept the weight component perpendicular to the key flats. This arrangement also permits the diaphragm segments of a particular row to be at different temperatures without displacing the seal ring.

From the foregoing description, it is apparent that the invention provides a seal arrangement which is an improvement over the structure disclosed in the aforesaid copending application and which reduces leakage of motive fluid past the seal assembly. Smaller radial seal clearances can be utilized, since the seal assembly is independent of the transient thermal response of the diaphragm segments. Furthermore, the components of the present seal structure can be assembled without requiring hand fitting of mating surfaces, as was required during the assembly of the prior seal structure.

Since numerous changes may be made in the above described construction, and different embodiments of the invention may be made without departing from the spirit and scope thereof, it is intended that all subject matter contained in the foregoing description, or shown in the accompanying drawings, shall be interpreted as illustrative and not in a limiting sense.

We claim as our invention:

1. In an axial flow elastic fluid machine, in combination,
    a casing of generally circular cross section,
    a rotor disposed within said casing and defining therewith an annular motive fluid passage,
    an annular row of blades carried by the rotor and extending radially outwardly across said passage,
    a diaphragm structure disposed within the casing in encompassing concentric relation with the rotor and having an annular array of stationary blades extending across said passage adjacent said rotor blades,
    said diaphragm including an arcuately segmented inner shroud ring carried by the stationary blades and having an arcuately segmented radially inwardly extending rib,
    an annular seal housing structure having a radially outwardly extending rib portion overlapping a portion of the rib on the inner shroud ring,
    an annular array of arcuately segmented seal segments carried by the seal housing structure in sealing relation with the rotor, and
    guide key means eccentrically mounted in one of said rib portions to permit centering of the seal housing and cooperating with the other of said overlapping rib portions to permit relative radial movement between the diaphragm segments and the seal housing structure and restrain rotative movement of the seal housing structure.

2. The combination defined in claim 1, including an additional annularly continuous rib on one of the structures axially spaced upstream in the motive fluid passage from the other rib on said one structure and having a surface on one side thereof forced into contact with one side of the rib on the other of said structures by motive fluid pressure to prevent motive fluid leakage across the seal housing.

3. The combination defined in claim 1, wherein one of the ribs has a radially extending slot therein, and
the guide key means includes a head portion having flat surfaces slidably disposed in the slot with a close fit and a cylindrical portion formed connected to the head portion and mounted to the other rib.

4. The combination defined in claim 3, including
a bushing having an eccentrically disposed opening therein receiving the cylindrical portion of the guide key means.

5. The combination defined in claim 4, wherein
the rib has a cylindrical opening therein receiving said bushing.

6. The combination defined in claim 5, including
means non-rotatably retaining the bushing in the cylindrical opening in the rib.

7. The combination defined in claim 6, wherein
the non-rotatably retaining means is a locking pin, and the one rib has a radial hole therein receiving said retaining means.

References Cited

UNITED STATES PATENTS

| | | | |
|---|---|---|---|
| 1,273,634 | 7/1918 | London | 103—111 |
| 1,298,524 | 3/1919 | London et al. | 253—78 |
| 1,855,890 | 4/1932 | Phillips | 253—78 |
| 2,229,963 | 1/1941 | Dickinson | 277—53 |
| 2,614,870 | 10/1952 | Ray | 103—111 |
| 3,230,710 | 1/1966 | Nimwegen et al. | 253—39 |
| 3,408,048 | 10/1968 | Scalzo | 253—78 |

FOREIGN PATENTS

| | | |
|---|---|---|
| 124,129 | 3/1919 | Great Britain. |
| 643,604 | 9/1950 | Great Britain. |

HENRY F. RADUAZO, Primary Examiner

U.S. Cl. X.R.

277—53; 415—110